United States Patent
Xu et al.

(10) Patent No.: US 11,241,707 B2
(45) Date of Patent: Feb. 8, 2022

(54) NOZZLE CLEANING DEVICE, DOCTOR BLADE REPLACING APPARATUS AND DOCTOR BLADE REPLACING METHOD

(71) Applicants: Hefei Xinsheng Optoelectronics Technology Co., Ltd., Hefei (CN); BOE TECHNOLOGY GROUP CO., LTD., Beijing (CN)

(72) Inventors: Min Xu, Beijing (CN); Chuang Gao, Beijing (CN); Jiasai Xu, Beijing (CN); Jiajia Shan, Beijing (CN); Yu Yang, Beijing (CN); Shuyin Lu, Beijing (CN); Zheng Fang, Beijing (CN)

(73) Assignees: Hefei Xinsheng Optoelectronics Technology Co., Ltd., Hefei (CN); BOE TECHNOLOGY GROUP CO., LTD., Beijing (CN)

( * ) Notice: Subject to any disclaimer, the term of this patent is extended or adjusted under 35 U.S.C. 154(b) by 332 days.

(21) Appl. No.: 16/341,965

(22) PCT Filed: Oct. 27, 2018

(86) PCT No.: PCT/CN2018/112270
§ 371 (c)(1),
(2) Date: Apr. 15, 2019

(87) PCT Pub. No.: WO2019/184328
PCT Pub. Date: Oct. 3, 2019

(65) Prior Publication Data
US 2019/0291127 A1    Sep. 26, 2019

(30) Foreign Application Priority Data
Mar. 26, 2018 (CN) .......................... 201820410502.5

(51) Int. Cl.
*B05B 15/50* (2018.01)
*B23Q 3/155* (2006.01)
*B08B 1/00* (2006.01)

(52) U.S. Cl.
CPC .............. *B05B 15/50* (2018.02); *B08B 1/005* (2013.01); *B08B 1/007* (2013.01); *B23Q 3/15566* (2013.01)

(58) Field of Classification Search
None
See application file for complete search history.

(56) References Cited

U.S. PATENT DOCUMENTS 9,468,946 B2   10/2016   Inamasu et al.
9,561,521 B2    2/2017   Jeong et al.
(Continued)

FOREIGN PATENT DOCUMENTS

| CN | 102581824 | 7/2012 |
|---|---|---|
| CN | 103041943 | 4/2013 |

(Continued)

OTHER PUBLICATIONS

International Search Report and Written Opinion from PCT Patent Application PCT/CN2018/112270 dated Feb. 1, 2019. Copy Provided, 12 pages.

*Primary Examiner* — Eric W Golightly
(74) *Attorney, Agent, or Firm* — Thomas | Horstemeyer, LLP

(57) ABSTRACT

The present disclosure provides a nozzle cleaning device, a doctor blade replacing apparatus and a doctor blade replacing method. The doctor blade replacing apparatus includes a first doctor blade box, a second doctor blade box, a transferring assembly and a clamping and conveying mechanism. The transferring assembly includes a first tray which is disposed between the first doctor blade box and the second doctor blade box and a pushing assembly which is config-
(Continued)

ured to push the first doctor blade in the first doctor blade box to the first tray and push the second doctor blade on the first tray into the second doctor blade box. The clamping and conveying mechanism is disposed between the first tray and the nozzle cleaning device for clamping and conveying the first doctor blade and the second doctor blade between the first tray and the nozzle cleaning device.

16 Claims, 3 Drawing Sheets

(56) References Cited

U.S. PATENT DOCUMENTS

| | | | |
|---|---|---|---|
| 9,931,663 | B2 | 4/2018 | Jeong et al. |
| 2012/0107514 | A1 | 5/2012 | Jeong et al. |
| 2014/0373779 | A1 | 12/2014 | Inamasu et al. |
| 2017/0120282 | A1 | 5/2017 | Jeong et al. |

FOREIGN PATENT DOCUMENTS

| | | |
|---|---|---|
| CN | 104106125 | 10/2014 |
| CN | 106733358 | 5/2017 |
| CN | 107470089 | 12/2017 |
| WO | 2014107927 | 7/2014 |

NOZZLE CLEANING DEVICE, DOCTOR BLADE REPLACING APPARATUS AND DOCTOR BLADE REPLACING METHOD

CROSS-REFERENCE TO RELATED APPLICATIONS

The present application is a § 371 national phase application of PCT Application No. PCT/CN2018/112270 filed Mar. 26, 2018, which claims the priority to Chinese Patent Application No. 201820410502.5, filed on Mar. 26, 2018, which is incorporated herein by reference in its entirety.

TECHNICAL FIELD

The present disclosure relates to the technical field of manufacturing a display panel, and particularly, relates to a nozzle cleaning device, a doctor blade replacing apparatus and a doctor blade replacing method.

BACKGROUND

In the process of manufacturing a liquid crystal panel, coating is a very common process, wherein, a material can be coated to a substrate through a nozzle of a coating device to form a film layer. After the coating is completed, the external of the nozzle needs to be cleaned. The existing cleaning method is to wipe the nozzle with a doctor blade. The doctor blade needs to be contacted and rubbed with the nozzle when cleaning, which will cause the doctor blade to wear out. Therefore, it is necessary to replace the doctor blade in time to ensure the cleaning effect.

Currently, the main manner of replacing the doctor blade is manual replacement, where an operator is required to manually discharge the used doctor blade and replace an unused doctor blade. However, manual doctor blade replacement is less efficient, which will reduce the production efficiency. Meanwhile, manual operation is dependent only on the experience and feeling of the operator. Therefore, it is difficult to ensure the uniformity of the mounting accuracy of the doctor blade. It is easy to damage the doctor blade due to installation errors.

It should be noted that the information disclosed in the above described background is only to enhance the understanding of the background of the present disclosure, thereby it may include information that does not constitute prior art known to those skilled in the art.

SUMMARY

According to one aspect of the present disclosure, a doctor blade replacing apparatus is provided for replacing a doctor blade of a nozzle cleaning device, the doctor blade replacing apparatus includes:

a first doctor blade box and a second doctor blade box, oppositely disposed and spaced with each other, the first doctor blade box configured to store a first doctor blade, the second doctor blade box configured to store a second doctor blade;

a transferring assembly, including a first tray which is disposed between the first doctor blade box and the second doctor blade box and a pushing assembly which is configured to push the first doctor blade in the first doctor blade box to the first tray and push the second doctor blade on the first tray into the second doctor blade box;

a clamping and conveying mechanism, disposed between the first tray and the nozzle cleaning device, and configured to clamp and convey the first doctor blade and the second doctor blade between the first tray and the nozzle cleaning device.

In an exemplary embodiment of the present disclosure, the transferring assembly further includes:

a second tray and a third tray, connected with the first doctor blade box and the second doctor blade box respectively, between which the first tray is located;

the pushing assembly includes:

a first pushing apparatus, configured to push the first doctor blade in the first doctor blade box to the second tray;

a second pushing apparatus, configured to push the first doctor blade on the second tray to the first tray; and a third pushing apparatus, configured to push the second doctor blade on the third tray into the second doctor blade box.

In an exemplary embodiment of the present disclosure, the clamping and conveying mechanism has a height difference with the first doctor blade box and the second doctor blade box, the clamping and conveying mechanism is at a second height, the first doctor blade box and the second doctor blade box are at a first height, both the second tray and the third tray are disposed with a height the same as the first height; wherein the first tray is disposed between the first doctor blade box and the second doctor blade box, and can be raised and lowered between the first height and the second height.

In an exemplary embodiment of the present disclosure, the clamping and conveying mechanism has a height difference with the first doctor blade box and the second doctor blade box, the clamping and conveying mechanism and the first tray are both at a second height, the first doctor blade box and the second doctor blade box are at a first height; wherein the second tray and the third tray can be raised and lowered between the first height and the second height.

In an exemplary embodiment of the present disclosure, the first doctor blade box is provided with a first storage slot for accommodating the doctor blade, the second tray is located at one end of the first storage slot facing the nozzle cleaning device, the first pushing apparatus is disposed at the other end of the first storage slot, and can push the first doctor blade in the first doctor blade box to move toward the second tray.

In an exemplary embodiment of the present disclosure, the second doctor blade box is provided with a second storage slot for accommodating the doctor blade, the third tray is located at one end of the second storage slot facing the nozzle cleaning device, the third pushing apparatus is disposed at one side of the third tray away from the second doctor blade box, and can push the second doctor blade on the third tray to move toward the second storage slot.

In an exemplary embodiment of the present disclosure, the clamping and conveying mechanism includes:

a clamping portion, having two clamping arms which can be opened and closed, the first doctor blade or the second doctor blade being capable of being clamped between the two clamping arms;

a guide rail, disposed above the first tray, configured to extend toward the nozzle cleaning device, and being slidably matched with the clamping portion; and a conveying and driving apparatus, configured to drive the clamping portion to move along the guide rail.

In an exemplary embodiment of the present disclosure, the doctor blade replacing apparatus further includes:

a transition platform, disposed under the clamping and conveying mechanism;

wherein the transition platform assists in supporting the doctor blade when the clamping portion clamps the first doctor blade or the second doctor blade to slide along the guide rail.

In an exemplary embodiment of the present disclosure, the first doctor blade is the doctor blade to be replaced, and the second doctor blade is the doctor blade discharged from the nozzle cleaning device.

According to another aspect of the present disclosure, a nozzle cleaning device is provided. The nozzle cleaning device includes a rail, a support rod, a cleaning platform and a fixing mechanism, one end of the support rod being slidably matched with the rail, the cleaning platform being disposed at the other end of the support rod, the fixing mechanism being disposed at the cleaning platform, wherein the nozzle cleaning device further includes:

the above described doctor blade replacing apparatus, configured to convey the first doctor blade and the second doctor blade between the first tray and the fixing mechanism by the above described clamping and conveying mechanism, such that the second doctor blade being capable of being discharged from the fixing mechanism and being replaced with the first doctor blade.

In an exemplary embodiment of the present disclosure, the first doctor blade and the second doctor blade are provided with a positioning hole, the fixing mechanism includes:

a mounting seat, fixed to the cleaning platform;

a positioning rod, telescopically disposed at the mounting seat configured to fix the first doctor blade or the second doctor blade by extending out and passing through the positioning hole, or configured to separate from the first doctor blade or the second doctor blade by retracting and being withdrawn from the positioning hole;

a positioning and driving apparatus, disposed at the mounting seat, configured to drive the positioning rod to extend and retract.

In an exemplary embodiment of the present disclosure, an outer circumference of one end of the positioning rod that passes through the first doctor blade or the second doctor blade is provided with a groove, a block piece is telescopically provided in the groove, the block piece blocks the first doctor blade or the second doctor blade when the block piece extends out from the groove.

In an exemplary embodiment of the present disclosure, the fixing mechanism further includes a pressure sensing apparatus for detecting a pressure of the first doctor blade or the second doctor blade to the mounting seat, and the positioning and driving apparatus can be controlled to extend out the positioning rod when the pressure is greater than a preset value.

In an exemplary embodiment of the present disclosure, the support rod can be slidably matched with the rail in a horizontally telescopic manner, and a telescopic direction of the support rod is perpendicular to a direction in which the rail extends.

In an exemplary embodiment of the present disclosure, two sides of the cleaning platform that are symmetric with respect to an axial direction of the support rod are respectively provided with the fixing mechanism, the two fixing mechanisms are detachably fixed with the first doctor blade or the second doctor blade respectively; wherein the nozzle cleaning device includes two doctor blade replacing apparatuses, and the two doctor blade replacing apparatuses are respectively disposed at the two sides of the cleaning platform and correspond to the first doctor blade or the second doctor blade fixed by the two fixing mechanisms.

According to one aspect of the present disclosure, a doctor blade replacing method of the above described nozzle cleaning device is provided, the doctor blade replacing method including:

a doctor blade discharging step, including: clamping and conveying the second doctor blade of the nozzle cleaning device to the first tray by the clamping and conveying mechanism such that the second doctor blade being discharged from the fixing mechanism; and a doctor blade replacing step, including: pushing the second doctor blade on the first tray into the second doctor blade box by the pushing assembly, pushing the first doctor blade in the first doctor blade box to the first tray by the pushing assembly, clamping and conveying the first doctor blade on the first tray to the nozzle cleaning device by the clamping and conveying mechanism such that the first doctor blade being fixed to the fixing mechanism.

It should be understood that the above general description and the following detailed description are exemplary and explanatory, and should not limit the present disclosure.

BRIEF DESCRIPTION OF THE DRAWINGS

The accompanying drawings herein are incorporated into the specification and formed a part of the present specification. The accompanying drawings show embodiments conforming the present disclosure, and are used to explain the principles of the present disclosure together with the specification. Obviously, the accompanying drawings described below are only some embodiments of the present disclosure, and other drawings can be obtained from these accompanying drawings without any creative effort for those skilled in the art.

DETAILED DESCRIPTION

Figure 1:
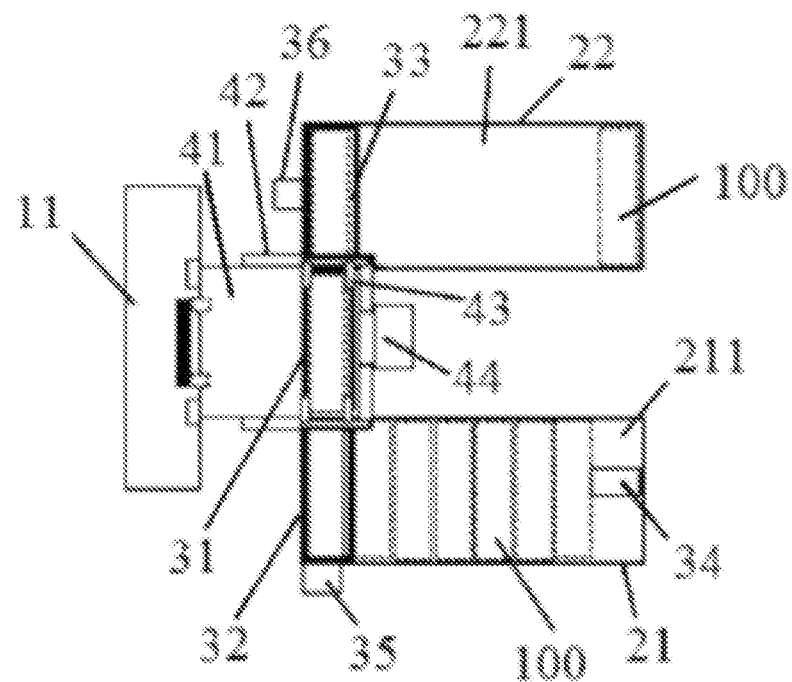
FIG. 1 is a top view of a doctor blade replacing apparatus according to an embodiment of the present disclosure in a first state.

Now, example embodiments will be described more comprehensive with reference to the accompanying drawings. However, the example embodiments can be implemented via various manners, and should not be understood as being limited to the embodiments set forth herein. Conversely, these embodiments are provided to make the present disclosure be comprehensive and complete, and the concept of the example embodiments will be comprehensively communicated to those skilled in the art. The same reference numerals in the accompanying figures denote the same or similar components, thereby detailed description thereof will be omitted.

Although relative terms such as "upper" and "lower" are used in the present specification to describe the relative relationship between one component and another component of the reference numerals, these terms used in the present specification are only for convenience, for example according to a direction of the example shown in the accompanying drawings. It should be understood that if an apparatus of a reference numeral is flipped to let the apparatus upside down, a component described "upper" will become the component "lower". When a component is "upper" the other component, it may refer to that the component is formed on the other component, or that the component is "directly" disposed on the other component, or that the component is "indirectly" disposed on the other component via another component.

The terms "one", "a/an", "this" and "the" are used to denote the existence of one or more elements/components/etc. The terms "including" and "having" are used to denote the meaning of open inclusion and may refer to the existence of additional element/component/etc. in addition to the listed element/component/etc. The terms "first", "second" and "third" etc. are used only as tags, and not as a limitation on the number of an object.

Figure 3:
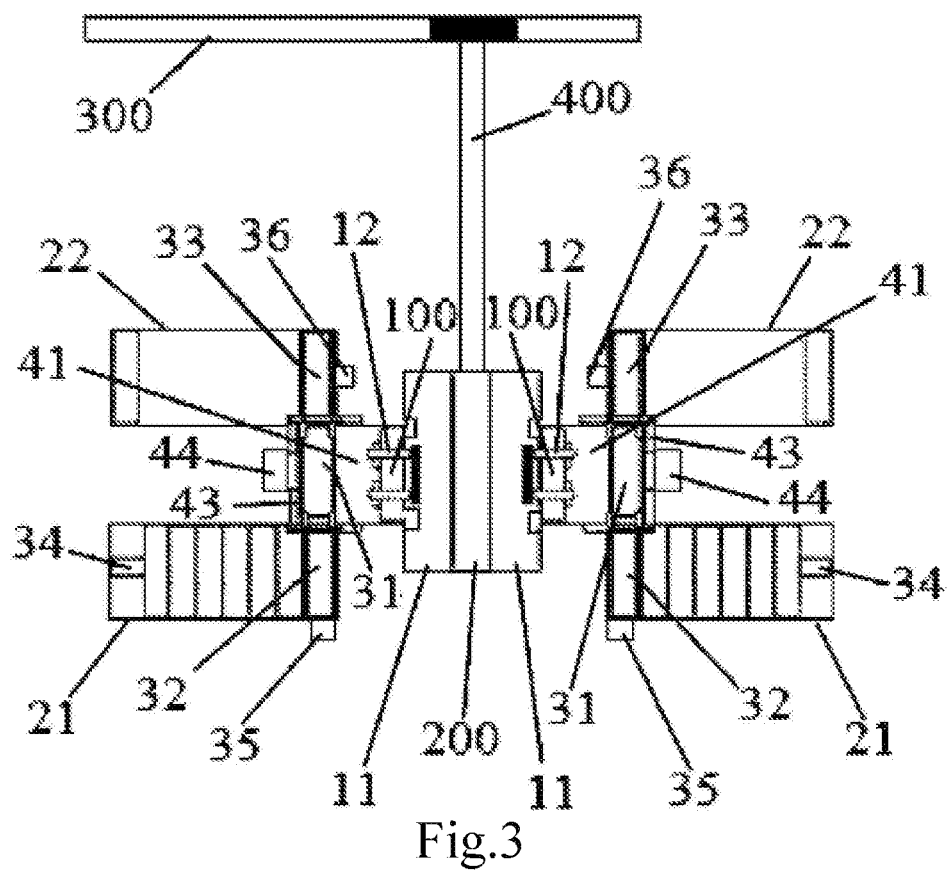
FIG. 3 is a top view of a cleaning platform of a nozzle cleaning device according to an embodiment of the present disclosure in a replacing position.
Figure 4:
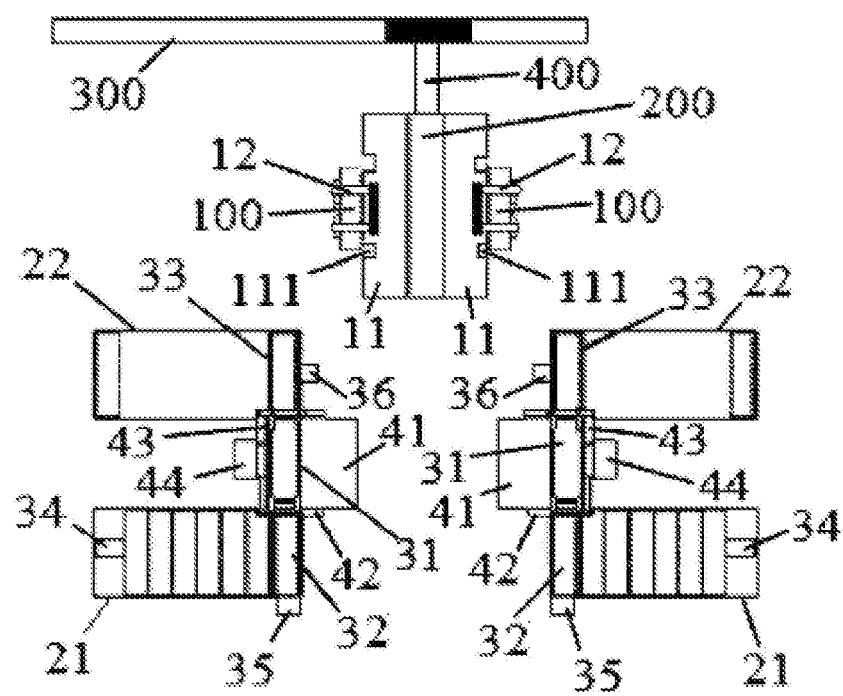
FIG. 4 is a top view of the cleaning platform of the nozzle cleaning device according to an embodiment of present disclosure in a cleaning position.

A doctor blade replacing apparatus is provided in an example embodiment of the present disclosure. As shown in FIGS. 3 and 4, the doctor blade replacing apparatus may be configured to replace a doctor blade 100 of a nozzle cleaning device. The doctor blade 100 may be mounted at a position of the nozzle cleaning device for mounting the doctor blade. It will be easy to understand by those skilled in the art that in order to apply the doctor blade replacing apparatus proposed by the present disclosure to a replacement for a doctor blade of the other type of device, various modifications, alterations, substitutions and the like of the following embodiments are all not departing from the scope of the principle of the doctor blade replacing apparatus proposed by the present disclosure.

Figure 2:
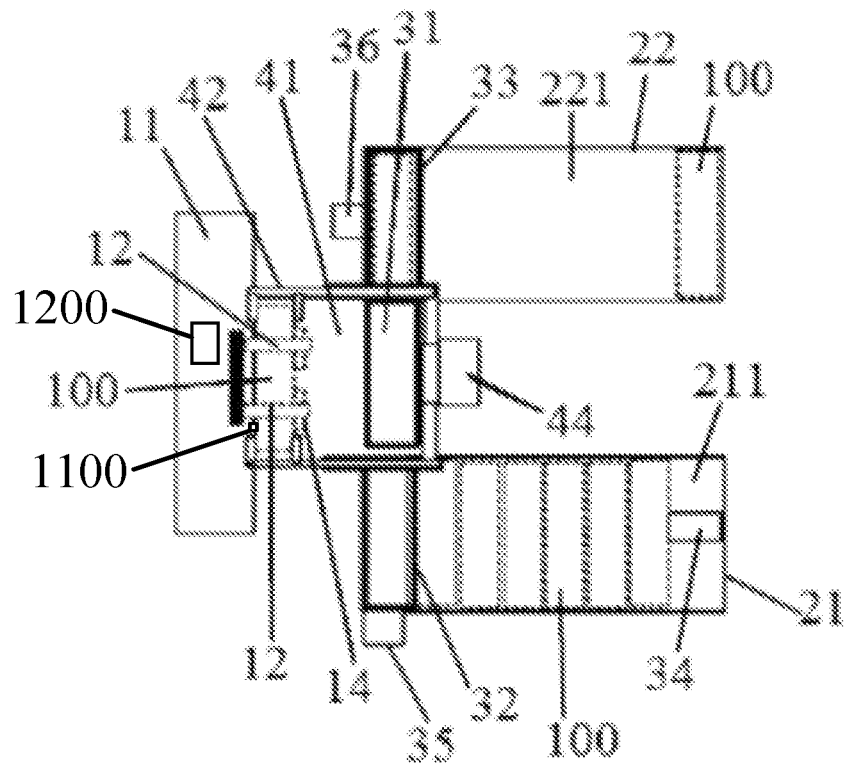
FIG. 2 is a top view of a doctor blade replacing apparatus according to embodiment of the present disclosure in a second state.

As shown in FIGS. 1 and 2, in the present embodiment, the doctor blade replacing apparatus proposed by the present disclosure may include a first doctor blade box 21, a second doctor blade box 22, a clamping and conveying mechanism, a transferring assembly and a transition platform 41. It should be noted that, since a part of the accompanying drawings (FIGS. 1 to 4) are top views of the doctor blade replacing apparatus and the nozzle cleaning device respectively, in the following description combined with the accompanying drawings, a so-called "horizontal direction" refers to a direction parallel to the plane of the paper, that is, a direction parallel to the horizontal plane or the ground in the actual space; while a so-called "vertical direction" refers to a direction perpendicular to the plane of the paper, that is, a direction perpendicular to the horizontal plane or the ground in the actual space, also that is, the direction defined a height, which is hereby described.

As shown in FIGS. 1 and 2, the first doctor blade box 21 and the second doctor blade box 22 are oppositely disposed in the horizontal direction and spaced with each other. Both the first doctor blade box 21 and the second doctor blade box 22 are used for storing the doctor blade 100. In the present embodiment, the first doctor blade box 21 is used to store the new doctor blade to be replaced, and the second doctor blade box 22 is used to store the old doctor blade discharged from the nozzle cleaning device.

As shown in FIGS. 1 and 2, in the present embodiment, taking the first doctor blade box 21 as an example, the first doctor blade box 21 may have a substantially table-like structure with an upper surface on which the new doctor blade to be replaced is placed. Specifically, the upper surface of the first doctor blade box 21 is provided with a first storage slot 211 in which a plurality of new doctor blades are sequentially placed. Furthermore, the second doctor blade box 22 may be designed referring to the above described design of the first doctor blade box 21, which is provided with a second storage 221 on the upper surface thereof. In the other embodiment, the two doctor blade boxes may also adopt other structural designs, and are not limited to the same structural design.

Figure 5:
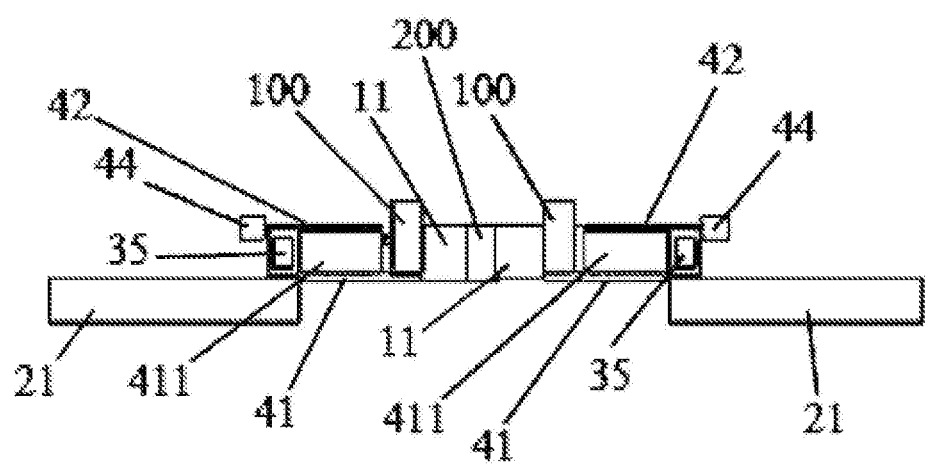
FIG. 5 is a front view of the nozzle cleaning device according to an embodiment of the present disclosure.

As shown in FIGS. 1, 2, and 5, in the present embodiment, the clamping and conveying mechanism is configured to clamp and convey the doctor blade 100. The old doctor blade discharged from the nozzle cleaning device may be clamped and conveyed by the clamping and conveying mechanism to the two doctor blade boxes, and transferred into the second storage slot 221 of the second doctor blade box 22 for storage by the transferring assembly. Meanwhile, the new doctor blade may be removed out from the first doctor blade box 21 by the transferring assembly, and clamped and conveyed to the nozzle cleaning device by the clamping and conveying mechanism in order to be mounted.

As shown in FIGS. 1, 2 and 5, in the present embodiment, the transferring assembly may include a first tray 31, a second tray 32, a third tray 33 and a pushing assembly. The first tray 31 is adjacently disposed between the second tray 32 and the third tray 33 in the horizontal direction. The second tray 32 can be disposed at one end of the first doctor blade box 21, whereby the new doctor blade in the first doctor blade box 21 may be pushed onto the second tray 32, then onto the first tray 31 from the second tray 32 by the pushing assembly, such that the new doctor blade supported on the first tray 31 may be clamped and conveyed to the nozzle cleaning device by the clamping and conveying mechanism. Similarly, the third tray 33 may be disposed at one end of the second doctor blade box 22, whereby after being conveyed from the nozzle cleaning device onto the first tray 31 by the clamping and conveying mechanism, the discharged old doctor blade may be pushed to the third tray 33, and then to the second doctor blade box 22 from the third tray 33 for storage by the pushing assembly. It should be noted that the above description is based on the case where the first tray 31, the second tray 32 and the third tray 33 are at the same height, that is, flush in the vertical direction, which is used as an example for explanation. The so-called "adjacent" can be understood as the three trays being adjacent and at the same height, so that the new and old doctor blades are pushed and transferred between the corresponding trays.

Specifically, one end of the first storage slot 211 of the first doctor blade box 21 adjacent to the second tray 32 is openly designed, that is, two ends of the first storage slot 211 are an open end and a closed end respectively. The open end is designed to allow the new doctor blade stored in the first doctor blade cassette 21 to be pushed into the second tray 32 via the open end by the pushing assembly to push to the second tray 32. In order to smoothly realize the above described pushing process, the second tray 32 is disposed with the same height as that of the upper surface of the first doctor blade box 21, that is, the bottom of the slot of the first storage slot 211.

Similarly, one end of the second storage slot 221 of the second doctor blade box 22 adjacent to the third tray 33 is openly designed, that is, the two ends of the second storage slot 221 are an open end and a closed end respectively. The open end is designed to allow the pushing assembly to push the old doctor blade supported on the third tray 33 to the second doctor blade box 22 via the open end for storage. In order to smoothly realize the above described push process, the third tray 33 is disposed with the same height as that of the upper surface of the second doctor blade box 22, that is, the bottom of the slot of the second storage slot 221.

It should be noted that the definition of "height" of the above related structure refers to the height position in the vertical direction based on the reference horizontal plane (for example, the ground) on which the structure is placed. The following description of the "height" of other component or structure can also refer to the above described explanation, which is hereby explained.

In addition, in the other embodiment, only the first tray 31 described above may be provided. At this time, one end of the bottom of the slot of the first storage slot 211 corresponding to the open thereof horizontally extends to form a supporting platform, and the supporting platform can be used to provide a similar function to the above described second tray 32. Moreover, one end of the bottom of the slot of the second storage slot 221 corresponding to the open thereof horizontally extends to form the other supporting platform, and the supporting platform can be used to provide a similar function to the above described third tray 33. In this embodiment, the first tray can be disposed between two supporting platforms formed by two doctor blade boxes.

As shown in FIGS. 1 and 2, in the present embodiment, in order to realize the above described pushing function of the pushing assembly to the doctor blade 100, the pushing assembly may include a first pushing apparatus 34, a second pushing apparatus 35 and a third pushing apparatus 36, wherein:

The first pushing apparatus 34 may be a cylinder, a hydraulic cylinder, a linear motor or the like. The first pushing apparatus 34 may be disposed in the first storage slot 211, which has one end fixed to the first doctor blade box 21, and the other end (for example, an end of the cylinder rod or an secondary of the linear motor) configured to push the new doctor blade to move toward the open end along the horizontal direction, such that the new doctor blade to be replaced can be pushed to the second tray 32 from the first storage slot 211 of the first doctor blade box 21 via the open end thereof by the first pushing apparatus 34.

The second pushing apparatus 35 may also be a cylinder, a hydraulic cylinder, a linear motor or the like, and the second pushing apparatus 35 can be disposed at one side of the second tray 32 away from the first tray 31 such that the new doctor blade on the second tray 32 can be pushed to the first tray 31 from the second tray 32 by the second pushing apparatus 35.

The third pushing apparatus 36 may also be a cylinder, a hydraulic cylinder, a linear motor or the like, and the third pushing apparatus 36 can be disposed at one side of the third tray 33 away from the second doctor blade box 22 and opposites with the open end of the second doctor blade box 22. The structure of the third pushing apparatus 36 can be the same as that of the first pushing apparatus 34 described above, and the third pushing apparatus 36 can push the old doctor blade on the third tray 33 into the second storage slot 221 of the second doctor blade box 22 via the open end, so as to realize the storage of the old doctor blade. As shown in FIGS. 1 and 2, in the present embodiment, the clamping and conveying mechanism can be disposed between the two doctor blade boxes and the nozzle cleaning device for conveying the doctor blade 100 between the first tray 31 and the nozzle cleaning device.

In particular, the clamping and conveying mechanism may include a clamping portion 43, a guide rail 42 and a conveying and driving apparatus 44, wherein:

The guide rail 42 can be mounted between the nozzle cleaning device and the first tray 31, and the guide rail 42 may include two parallel slides. The clamping portion 43 may have two clamping arms and a clamping and driving apparatus. The two clamping arms can be slidably matched with the two slides of the above described guide rail 42, respectively. The clamping and driving apparatus can drive the two clamping arms to open and close, that is, to move in the opposite direction or in the back direction, thereby the doctor blade 100 can be clamped between the two clamping arms. The clamping and driving apparatus may include two cylinders or two linear motors, or may also include a rotary motor and a screw nut pair with two nuts, as long as the two clamping arms can be opened and closed, which will not be enumerated here. The conveying and driving apparatus 44 may be a cylinder, a hydraulic cylinder or a linear motor or the like, and may be used to drive the clamping portion 43 to reciprocally slide along the guide rail 42 between the nozzle cleaning device and the first tray 31.

Further, as shown in FIGS. 1 and 2, in the present embodiment, a transition platform 41 may be disposed under the clamping and conveying mechanism to provide an auxiliary supporting function to the conveyed doctor blade 100 through the transition platform 41 when the clamping portion 43 clamps the doctor blade 100 to move along the guide rail 42.

As mentioned above, the basic replacing process of new and old doctor blades is as follows: The old doctor blade is discharged from the nozzle cleaning device, and then clamped and conveyed to the first tray 31 by the clamping and conveying mechanism. The first pushing apparatus 34 pushes a new doctor blade in the first doctor blade box 21 to the second tray 32. The second pushing apparatus 35 pushes the new doctor blade in the second tray 32 to the first tray 31, and the original old doctor blade in the first tray 31 is ejected out by the new doctor blade and moved to the third tray 33 during the process. The third pushing apparatus 36 pushes the old doctor blade in the third tray 33 into the second doctor blade box 22 for storage.

It should be noted that, when the height from a position of the nozzle cleaning device on which the doctor blade 100 is mounted to the ground is higher than the height where the first doctor blade box 21, the second doctor blade box 22 and the trays in the above described content are located, if it is desired a preferable design scheme to maintain the clamping and conveying mechanism (e.g., guide rail 42) be horizontally disposed, some of the trays can be selectively designed to be a structure that can be raised and lowered, so as to adapt the problem of height difference between the above described structures. The design of each tray that can be raised and lowered may at least include the following modes:

First, for convenience of explanation, the height of the first tray 31 relative to the ground is defined as the first height when the first tray 31 is not raised, and the height of the first tray 31 is the same as the height of the two doctor blade boxes at this time. Since the height of the clamping and conveying mechanism is higher than the height of the not raised first tray 31, the height of the doctor blade relative to the ground when clamped by the clamping portion 43 is defined as the second height.

Mode One:

The first tray 31 can be designed to be raised and lowered so that it can be raised and lowered between the first height and the second height in the vertical direction. The raising and lowering of the first tray 31 can be driven by a raising and lowering driving apparatus, and the raising and lowering driving apparatus may be a cylinder, a hydraulic cylinder or the like. Both the second tray 32 and the third tray 33 adopt a fixed design, which cannot be raised and lowered, and are aligned with the heights of the two doctor blade boxes respectively, that is, disposed at the same height as the first height described above.

Accordingly, the basic replacing process for the new and old doctor blades is as follows: The old doctor blade is discharged from the nozzle cleaning device, and then clamped and conveyed to the above of the first tray 31 by the clamping and conveying mechanism. The first tray 31 is raised to the second height from the first height. The clamping and conveying mechanism places the old doctor blade on the first tray 31. The first pushing apparatus 34 pushes a new doctor blade in the first doctor blade box 21 to the second tray 32. The first tray 31 is lowered to the first height from the second height. The second pushing apparatus 35 pushes the new doctor blade in the second tray 32 to the first tray 31, and the original old doctor blade in the first tray 31 is ejected out by the new doctor blade and moved to the third tray 33 during this process. The third pushing apparatus 36 pushes the old doctor blade in the third tray 33 into the second doctor blade box 22 for storage.

Mode Two:

The second tray 32 and the third tray 33 may be designed to be raised and lowered respectively. Particularly, related design scheme of the mode one may be referred so as to allow the two trays to be raised and lowered between the first height and the second height in the vertical direction. The first tray 31 adopts a fixed design that cannot be raised and lowered and can be disposed at the same height as the second height described above.

Accordingly, the basic replacing process for the new and old doctor blades is as follows: The old doctor blade is discharged from the nozzle cleaning device, and clamped and conveyed to the above of the first tray 31 by the clamping and conveying mechanism to then be placed on the first tray 31. The first pushing apparatus 34 pushes a new doctor blade in the first doctor blade box 21 to the second tray 32. The second tray 32 and the third tray 33 raise to the second height from the first height respectively, the second pushing apparatus 35 pushes the new doctor blade in the second tray 32 to the first tray 31, and the original old doctor blade in the first tray 31 is ejected out by the new doctor blade and moved to the third tray 33 during this process. The third tray 33 is lowered to the first height from the second height, and the third pushing apparatus 36 pushes the old doctor blade in the third tray 33 into the second doctor blade box 22 for storage.

In addition, according to the different combined schemes of the above described trays for the design that can be raised and lowered or the design that height fixed, the disposed height of each pushing apparatus is also adjusted according to the height position of the corresponding tray, and will not be described here.

It should be noted that based on each above described tray selectively designed as a structure that can be raised and lowered, there may be a height difference between the trays in the vertical direction during the working process of the doctor blade replacing apparatus. However, in the top-viewed structure shown in some of the accompanying drawings (FIGS. 1 to 4), only the projecting pattern of each tray in the horizontal direction can be seen, and a height staggered state that may appear in the vertical direction is not shown. It will be easy to understand that regardless of whether the trays are of a design that can be raised and lowered, the relationship of the trays may also be adjacently disposed. The so-called "adjacent" can be deemed that in the accompanying drawings the projection of the first tray 31 and the second tray 32 (or the first tray 31 and the third tray 33) are adjacent in the horizontal direction, which can ensure the pushing and transferring of the doctor blade between adjacent trays when each tray is not designed to be raised and lowered, or ensure the pushing and transferring of the doctor blade between adjacent trays which is raised/lowered to the same height when each tray is selectively designed to be raised and lowered.

An embodiment of the present disclosure also provides a nozzle cleaning device. As shown in FIGS. 3 to 5, the nozzle cleaning device of the present embodiment may include a fixing mechanism, a rail 300, a support rod 400, a cleaning platform 200, a doctor blade 100 and a doctor blade replacing apparatus of any one of the above described embodiments. The rail 300 and the support rod 400 are all horizontally disposed. One end of the support rod 400 is matched with the rail 300, and the other end of the support rod 400 is provided with a cleaning platform 200. The doctor blade 100 is detachably fixed to the cleaning platform 200 by the fixing mechanism.

As shown in FIGS. 1 and 2, in the present embodiment, the fixing mechanism may include a mounting seat 11, a positioning rod 12, a positioning and driving apparatus 1200, a block piece 14, a block piece driving apparatus and a pressure sensing apparatus 1100, wherein:

The mounting seat 11 may be a flat plate structure, and may be in the shape of a rectangular parallelepiped, a cylinder or the like, and is not particularly limited herein. Meanwhile, the mounting seat 11 can be detachably fixed to a side of the cleaning platform 200 by snapping or by bolting or the like.

Further, based on a design that the clamping portion 43 of the clamping and conveying mechanism in the above described embodiment includes two clamping arms. The mounting seat 11 is provided with two escape slots 111. The two escape slots 111 correspond to the two clamping arms respectively, such that the two clamping arms could extend into the two escape grooves 111 respectively when the clamping portion 43 moves to the nozzle cleaning device along the guide rail 42, thereby avoiding structural interference.

As shown in FIGS. 1 and 2, the positioning rod 12 is telescopically disposed on the mounting seat 11. For example, a cavity may be formed in the mounting seat 11, and a mounting hole is formed at a surface of the mounting seat 11. The positioning rod 12 can penetrate into the cavity via the mounting hole and can slide along the mounting hole so as to extend out or retracting to the mounting seat 11. A positioning hole may be provided on the doctor blade 100, which has a shape and size matched with the positioning rod 12. When extending out of the mounting seat 11, the positioning rod 12 can be matched through the positioning hole, and when retracting to the mounting seat 11, the positioning rod 12 can be separated from the doctor blade 100. Meanwhile, the number of the positioning rod 12 and the positioning hole may be two. The two positioning rods 12 can be matched through the two positioning holes in a one-to-one correspondence. Certainly, in another embodiment of the present disclosure, the number of the positioning rod 12 and the positioning hole may be one or more than two, which is not particularly limited herein.

As shown in FIG. 2, the circumference of one end of the positioning rod 12 that can pass through the doctor blade 100 may be provided with a groove. The block piece 14 can be disposed in the groove and can extend out or retract into the groove. After the positioning rod 12 passes through the positioning hole of the doctor blade 100, the blocking piece 14 can be extended out of the groove, so that the doctor blade 100 is located between the block piece 14 and the mounting seat 11, thus fixing the doctor blade 100. The blocking piece 14 can be first retracted into the groove and then the positioning rod 12 is retracted into the mounting seat 11, when the doctor blade 100 needs to be discharged. Meanwhile, the number of the groove and the block piece 14 may both be one or more, and is not particularly limited herein.

The positioning and driving apparatus 1200 may be an apparatus that can output linear motion, such as a cylinder, a hydraulic cylinder, or a linear motor etc. The positioning and driving apparatus 1200 can be disposed in the mounting seat 11 and connected to the positioning rod 12 to drive the positioning rod 12 to extend out or retract into the mounting seat 11.

The block piece driving apparatus may include a motor and a transmission mechanism. The block piece 14 can be connected to the motor via the transmission mechanism and can be extended out or retracted into the groove by the motor. The transmission mechanism may include a meshed gear and rack. The gear may be connected to the motor and the rack may be connected with the block piece 14. The transmission mechanism may also adopt other transmission component, which will not be enumerated here.

The pressure sensing apparatus 1100 may include a pressure sensor. The pressure sensor may be disposed at the surface of the mounting seat 11 in contact with the doctor blade 100 for detecting the pressure of the doctor blade 100 to the mounting seat 11. Also, it indicates that the doctor blade 100 has been engaged with the mounting seat 11 when the pressure sensed by the pressure sensing apparatus 1100 is greater than a preset value, and the positioning and driving apparatus 1200 can be controlled to extend out the positioning rod 12. The extended position can be preset as long as the positioning rod 12 can pass through the doctor blade 100 and the block piece 14 extends out from the groove to block the doctor blade 100, thereby automatically fixing the doctor blade 100.

In another embodiment of the present disclosure, the fixing mechanism may be another structure as long as the doctor blade 100 can be detachably fixed, and will not be enumerated here.

Further, a coating device with a nozzle to be cleaned and the doctor blade replacing apparatus are disposed spaced with each other in the horizontal direction. Based on this, the rail 300 may be disposed at a side of the coating device away from the doctor blade replacing apparatus, or also be disposed at a side of the doctor blade replacing apparatus away from the coating device. The support rod 400 may be a telescopic structure, and the telescopic direction thereof (i.e., the extending direction) is the horizontal direction perpendicular to the rail 300. Thus, the cleaning platform 200 can be moved between the coating device with the nozzle to be cleaned and the doctor blade replacing apparatus in the horizontal direction perpendicular to the rail 300. For convenience of explanation, a position where the cleaning platform 200 is moved to the coating device is defined as a cleaning position in the following. Meanwhile, a position where the cleaning platform 200 is moved to the doctor blade replacing apparatus is defined as the replacing position.

Accordingly, the nozzle cleaning device is mainly used for cleaning the nozzle and replacing the doctor blade. The support rod 400 is extended and retracted to move the cleaning platform 200 to the cleaning position when the nozzle needs to be cleaned. At this time, the nozzle of the coating device can be cleaned by the doctor blade 100 mounted at the cleaning platform 200. The support rod 400 is extended and retracted to move the cleaning platform 200 to the replacing position when the doctor blade needs to be replaced. At this time, the doctor blade 100 mounted at the cleaning platform 200 can be replaced by the doctor blade replacing apparatus.

In the present embodiment, based on the design that the fixing mechanism and the doctor blade are disposed on both sides of the cleaning platform 200 respectively, the number of the doctor blade replacing apparatus may be two. Also, the two doctor blade replacing apparatuses are oppositely disposed with the respective clamping and conveying mechanisms. The two clamping and conveying mechanisms respectively correspond to the fixing mechanisms on both sides of the cleaning platform 200 when the cleaning platform 200 is moved between the two doctor blade replacing apparatus. Thus, the doctor blades 100 at both sides of the cleaning platform 200 can be replaced at the same time. The replacing principle may reference the embodiment of the above described doctor blade replacing apparatus, which will not be described in detail herein. Certainly, in other example embodiments of the present disclosure, the number of the cleaning platform 200 and the doctor blade replacing apparatus may also both be one.

After considering the specification and practicing the disclosure herein, it will be apparent for those skilled in the art to think of the other implementations of the disclosure. The present application intends to cover any variants, usage or adaptation changes of the present disclosure. These variants, usage or adaptation changes follow the general principles of the present disclosure, and include common sense or common technical means in the technical field not disclosed by the disclosure. The specification and embodiments are only exemplary, and the true scope and spirit of the present disclosure are defined by the appended claims.

What is claimed is:

1. A doctor blade replacing apparatus for replacing a doctor blade of a nozzle cleaning device, wherein the doctor blade replacing apparatus comprises:
   a first doctor blade box configured to store a first doctor blade;
   a second doctor blade box oppositely disposed and spaced with the first doctor blade box, and configured to store a second doctor blade;
   a transferring assembly comprising a first tray is disposed between the first doctor blade box and the second doctor blade box, and a pushing assembly which is configured to push the first doctor blade in the first doctor blade box to the first tray and push the second doctor blade on the first tray into the second doctor blade box; and
   a clamping and conveying mechanism disposed between the first tray and the nozzle cleaning device, and configured to clamp and convey the first doctor blade and the second doctor blade between the first tray and the nozzle cleaning device.

2. The doctor blade replacing apparatus according to claim 1, wherein the transferring assembly further comprises:
   a second tray and a third tray connected with the first doctor blade box and the second doctor blade box, respectively, between which the first tray is located;
   wherein the pushing assembly comprises:
      a first pushing apparatus configured to push the first doctor blade in the first doctor blade box to the second tray;

a second pushing apparatus configured to push the first doctor blade on the second tray to the first tray; and
a third pushing apparatus configured to push the second doctor blade on the third tray into the second doctor blade box.

3. The doctor blade replacing apparatus according to claim 2, wherein:
the clamping and conveying mechanism has a height difference with the first doctor blade box and the second doctor blade box;
the clamping and conveying mechanism is at a first height;
the first doctor blade box and the second doctor blade box are at a second height;
both the second tray and the third tray are disposed with a height the same as the second height; and
the first tray is disposed between the first doctor blade box and the second doctor blade box, and can be raised and lowered between the first height and the second height.

4. The doctor blade replacing apparatus according to claim 2, wherein:
the clamping and conveying mechanism has a height difference with the first doctor blade box and the second doctor blade box;
the clamping and conveying mechanism and the first tray are both at a first height;
the first doctor blade box and the second doctor blade box are at a second height; and
the second tray and the third tray can be raised and lowered between the first height and the second height.

5. The doctor blade replacing apparatus according to claim 2, wherein:
the first doctor blade box is provided with a first storage slot for accommodating the first doctor blade;
the second tray is located at one end of the first storage slot facing the nozzle cleaning device, and
the first pushing apparatus is disposed at the other end of the first storage slot and can push the first doctor blade in the first doctor blade box to move toward the second tray.

6. The doctor blade replacing apparatus according to claim 2, wherein:
the second doctor blade box is provided with a storage slot for accommodating the second doctor blade;
the third tray is located at one end of the storage slot facing the nozzle cleaning device; and
the third pushing apparatus is disposed at one side of the third tray away from the second doctor blade box, and can push the second doctor blade on the third tray to move toward the storage slot.

7. The doctor blade replacing apparatus according to claim 1, wherein the clamping and conveying mechanism comprises:
a clamping portion, having two clamping arms which can be opened and closed, the first doctor blade or the second doctor blade being capable of being clamped between the two clamping arms;
a guide rail, disposed above the first tray, configured to extend toward the nozzle cleaning device, and being slidably matched with the clamping portion; and
a conveying and driving apparatus, configured to drive the clamping portion to move along the guide rail.

8. The doctor blade replacing apparatus according to claim 7, wherein the doctor blade replacing apparatus further comprises:
a transition platform disposed under the clamping and conveying mechanism;
wherein the transition platform assists in supporting the first doctor blade or the second doctor blade correspondingly when the clamping portion clamps the first doctor blade or the second doctor blade slide along the guide rail.

9. The doctor blade replacing apparatus according to claim 1, wherein the first doctor blade is a doctor blade to be replaced, and the second doctor blade is a doctor blade discharged from the nozzle cleaning device.

10. A nozzle cleaning device, comprising:
a rail, a support rod, a cleaning platform, and a fixing mechanism, one end of the support rod being slidably matched with the rail, the cleaning platform being disposed at the other end of the support rod, the fixing mechanism being disposed at the cleaning platform;
a doctor blade replacing apparatus for replacing a doctor blade of a nozzle cleaning device, wherein the doctor blade replacing apparatus comprises:
a first doctor blade box, configured to store a first doctor blade;
a second doctor blade box, oppositely disposed and spaced with the first doctor blade box, and configured to store a second doctor blade;
a transferring assembly, comprising a first tray which is disposed between the first doctor blade box and the second doctor blade box and a pushing assembly which is configured to push the first doctor blade in the first doctor blade box to the first tray and push the second doctor blade on the first tray into the second doctor blade box; and
a clamping and conveying mechanism, disposed between the first tray and the nozzle cleaning device, and configured to clamp and convey the first doctor blade and the second doctor blade between the first tray and the nozzle cleaning device;
wherein the doctor blade replacing apparatus is configured to convey the first doctor blade and the second doctor blade between the first tray and the fixing mechanism by the clamping and conveying mechanism, such that the second doctor blade is capable of being discharged from the fixing mechanism and replaced with the first doctor blade.

11. The nozzle cleaning device according to claim 10, wherein the first doctor blade and the second doctor blade are provided with a positioning hole, the fixing mechanism comprising:
a mounting seat, fixed to the cleaning platform;
a positioning rod, telescopically disposed at the mounting seat configured to:
fix the first doctor blade or the second doctor blade by extending out and passing through the positioning hole, or
separate from the first doctor blade or the second doctor blade by retracting and being withdrawn from the positioning hole; and
a positioning and driving apparatus, disposed at the mounting seat, configured to drive the positioning rod to extend and retract.

12. The nozzle cleaning device according to claim 11, wherein:
an outer circumference of one end of the positioning rod that passes through the first doctor blade or the second doctor blade is provided with a groove,
a block piece is telescopically provided in the groove, and
the block piece blocks the first doctor blade or the second doctor blade when the block piece extends out from the groove.

13. The nozzle cleaning device according to claim 11, wherein:
the fixing mechanism further comprises a pressure sensing apparatus for detecting a pressure of the first doctor blade or the second doctor blade to the mounting seat, and
the positioning and driving apparatus can be controlled to extend out the positioning rod when the pressure is greater than a preset value.

14. The nozzle cleaning device according to claim 10, wherein:
the support rod is slidably matched with the rail in a horizontally telescopic manner, and
a telescopic direction of the support rod is perpendicular to a direction in which the rail extends.

15. The nozzle cleaning device according to claim 10, wherein:
the nozzle cleaning device further comprises two fixing mechanisms;
two sides of the cleaning platform that are symmetric with respect to an axial direction of the support rod are each respectively provided with one of the fixing mechanisms;
the two fixing mechanisms are detachably fixed with the first doctor blade or the second doctor blade respectively;
the nozzle cleaning device comprises two doctor blade replacing apparatuses, and
the two doctor blade replacing apparatuses are respectively disposed at the two sides of the cleaning platform and correspond to the first doctor blade or the second doctor blade fixed by the two fixing mechanisms.

16. A doctor blade replacing method for a nozzle cleaning device, the nozzle cleaning device comprising a rail, a support rod, a cleaning platform and a fixing mechanism, one end of the support rod being slidably matched with the rail, the cleaning platform being disposed at the other end of the support rod, the fixing mechanism being disposed at the cleaning platform, wherein the nozzle cleaning device further comprises:
a doctor blade replacing apparatus for replacing a doctor blade of a nozzle cleaning device, wherein the doctor blade replacing apparatus comprises:
a first doctor blade box, configured to store a first doctor blade;
a second doctor blade box, oppositely disposed and spaced with the first doctor blade box, and configured to store a second doctor blade;
a transferring assembly, comprising a first tray which is disposed between the first doctor blade box and the second doctor blade box and a pushing assembly which is configured to push the first doctor blade in the first doctor blade box to the first tray and push the second doctor blade on the first tray into the second doctor blade box; and
a clamping and conveying mechanism, disposed between the first tray and the nozzle cleaning device, and configured to clamp and convey the first doctor blade and the second doctor blade between the first tray and the nozzle cleaning device;
wherein, the doctor blade replacing apparatus is configured to convey the first doctor blade and the second doctor blade between the first tray and the fixing mechanism by the clamping and conveying mechanism, such that the second doctor blade is capable of being discharged from the fixing mechanism and being replaced with the first doctor blade;
wherein the doctor blade replacing method comprises:
a doctor blade discharging step, comprising: clamping and conveying the second doctor blade of the nozzle cleaning device to the first tray by the clamping and conveying mechanism such that the second doctor blade is discharged from the fixing mechanism; and
a doctor blade replacing step, comprising: pushing the second doctor blade on the first tray into the second doctor blade box by the pushing assembly, pushing the first doctor blade in the first doctor blade box to the first tray by the pushing assembly, and clamping and conveying the first doctor blade on the first tray to the nozzle cleaning device by the clamping and conveying mechanism such that the first doctor blade is fixed to the fixing mechanism.

* * * * *